United States Patent [19]
Weigert

[11] Patent Number: 4,702,577
[45] Date of Patent: Oct. 27, 1987

[54] FILM TRANSPORT DEVICE

[75] Inventor: Dedo Weigert, Munich, Fed. Rep. of Germany

[73] Assignee: Dedo Weigert Film GmbH, Munich, Fed. Rep. of Germany

[21] Appl. No.: 866,885

[22] Filed: May 23, 1986

Related U.S. Application Data

[63] Continuation-in-part of Ser. No. 641,972, Aug. 17, 1984, abandoned.

[51] Int. Cl.⁴ .............................................. G03B 1/22
[52] U.S. Cl. .................................... 352/191; 352/180; 352/187; 226/55; 226/57
[58] Field of Search ...................... 352/180, 187, 191; 226/55, 56, 57

[56] References Cited

U.S. PATENT DOCUMENTS

| 3,588,813 | 3/1952 | Dube | 352/187 |
| 3,602,585 | 8/1971 | Steibl et al. | 352/216 |
| 3,830,565 | 8/1974 | Fundingland | 352/191 |
| 3,951,531 | 4/1976 | Nakai et al. | 352/216 |
| 4,022,525 | 5/1977 | Boudouris | 352/187 |
| 4,150,886 | 4/1979 | Merkel et al. | 352/180 |
| 4,360,254 | 11/1982 | Nyman et al. | 352/187 |

FOREIGN PATENT DOCUMENTS

| 867051 | 12/1952 | Fed. Rep. of Germany | 352/191 |
| 2333021 | 1/1975 | Fed. Rep. of Germany | 352/187 |
| 2818910 | 11/1978 | Fed. Rep. of Germany | 352/187 |
| 181893 | 5/1953 | Sweden | 352/191 |
| 118231 | 8/1918 | United Kingdom | 352/187 |
| 643390 | 9/1950 | United Kingdom | 352/187 |

Primary Examiner—Monroe H. Hayes
Attorney, Agent, or Firm—Woodcock Washburn Kurtz Mackiewicz & Norris

[57] ABSTRACT

A film transport device for cinematographic cameras and projectors has a rotary shutter, an intermittently operating film feed device, an adjusting device with at least one adjusting pin engaging in one perforation of the film and separate drive motors for the rotary shutter, adjusting device and film feed device and is further characterized by having the drives for both the adjusting device and for the film feed controlled synchronously with the rotary shutter by a common control unit.

4 Claims, 2 Drawing Figures

FILM TRANSPORT DEVICE

CROSS-REFERENCE TO RELATED APPLICATION

This application is a continuation-in-part of copending U.S. Ser. No. 641,972, filed Aug. 17, 1984, now abandoned.

BACKGROUND OF THE INVENTION

1. Field of the Invention

The present invention pertains to a film transport device for cinematographic cameras and projectors with an intermittently operating film feed device and with a rotary shutter, wherein the film feed device engages perforations of the film and is driven by a drive motor which can be controlled synchronously with the separately driven rotary shutter.

2. Description of the Prior Art

A single, common motor has been used in most of the movie cameras and movie projectors used hitherto for driving all movable parts of the film transport device and of the shutter, because of the necessity to synchronously control these parts. As a consequence of this, complicated gear mechanisms are necessary, which have to transform the continuous movement of the drive into the intermittent movement of the film.

Mechanical pin assemblies are used for the film transport, especially in movie cameras. A pin which is steadily in motion periodically engages in the perforations of the film in order to forward it. In order for the pin tip to describe a suitable path, a very complicated mechanical structure is necessary. Despite a relatively slow film transport, the film is strongly compromised by the pin assembly. In addition, the mechanism generates considerable running noise, which is particularly disadvantageous in the case of simultaneous shooting and sound recording.

The tripping mechanisms, which are used primarily in projectors, in which several teeth of a toothed film feed drum are steadily engaged in the perforations of the film, and which periodically rotate further by a well-defined angle in order to transport the film, compromise the film much less. The common tripping mechanisms with Geneva motion drive are, however, also very noisy and are particularly not suitable for use in movie cameras because of their complicated structure.

A film transport device for movie projectors is known from DE-OS No. 28 18 910, which discloses a tripping mechanism with separate drive motors for the rotary shutter and for the film feed. The drive motor for the film feed is a stepping motor whose drive pulses are synchronized with the rotation of the rotary shutter. This film transport device has the disadvantage that the stepping motor must operate very exactly to achieve a sufficiently good picture steadiness, i.e., both the control and the motor itself must be of an expensive design. In particular, this requires the stepping motor to be designed to be relatively large and heavy, whereby the possible applications in portable units are greatly restricted. In addition, it is difficult to optimize the stepping motor in terms of high accuracy, high speed and gentle film transport.

SUMMARY OF THE INVENTION

The present invention has the basic object of creating a film transport device and method of operation which brings about rapid but still gentle and low-noise film transport with precise picture steadiness. The entire structure should therefore be so small and light-weight that it is also suitable for use in portable movie cameras.

Based on a film transport device of the type described above, this object is solved according to the present invention by an adjusting device with a suitable electric or electromagnetic drive and at least one adjusting pin engaging in one perforation of the film, wherein the drive of the adjusting device and the film drive motor have a common control.

This device according to the present invention has the advantage that the high film feed speed is complemented by a very quickly operating adjusting device. The film, which is tripped only approximately by one frame, is brought into the definite, correct position for exposure by the adjusting device, and held there during the exposure. No particularly stringent requirements are therefore imposed on the film transport drive motor in terms of the accuracy of the film positioning. The film feed device can therefore be so small and lightweight that the essential advantage of the tripping mechanisms over the pin assemblies, namely, the gentle film transport, can be utilized in portable movie cameras as well. The complete mechanical separation of the shutter, film feed and adjustment functions eliminates disadvantageous reactions, and the corresponding drives can be also built of relatively few and simple component parts and can be easily optimized. Yet, the necessary synchronization of the movement processes is guaranteed because of the common control of the drives, which preferably originates from the rotary shutter.

The separate drive of the film feed device suitably consists of means for engaging the film perforations driven by a stepping motor. Preferably, the engaging means consists of a toothed drum. The stepping motor can easily be designed in such a way as to prevent excessive torques during the start of the film feed device and consequent strong acceleration forces on the film, and so that a high feed speed is still reached with uniform acceleration.

The separate drive of the adjusting device consists preferably of an electromagnetic drive which magnetically fixes the oscillatingly-suspended or linearly-supported adjusting pin which is provided with or consists of a magnetic material, in the corresponding end positions and brings the pin rapidly from one end position into the other by a pole change of the magnetic field. The adjusting pin or pins oscillating in the magnetic field operate at a very low noise level, because mechanical stops are not necessary, and no noise is generated during the engagement of the ends of the adjusting pins in the perforations of the film due to the flat conical shape of the ends of the pins. Further, a separate stepping motor can also be used as the drive for the adjusting pin, which stepping motor likewise ensures the necessary rapid movements of the adjusting pins, interrupted by the corresponding holding or exposure phase pauses.

The common control of the film drive motor and of the adjusting device drive is based preferably on markings on the rotary shutter. A very exact, rapid control can be achieved, for example, by means of reflecting or perforated markings on the rotary shutter in connection with properly arranged photoelectric cells acting as scanning devices for the control unit.

In another embodiment, the markings for controlling the film feed and adjusting devices are provided on a separate, rotary disk linked with the rotary shutter, rather than on the rotary shutter proper.

The rapid film feed in connection with the likewise very rapid adjusting device of the film transport device according to the present invention permits a relative opening by more than 180° of the rotary shutter. At a fixed frame frequency this leads to longer exposure times for a phase picture and thus to higher speed of the instrument, or, in other words, corresponds to the effect which would be obtained by the use of a filmstock of higher sensitivity.

BRIEF DESCRIPTION OF THE DRAWING

The present invention will be described below in more detail based on the embodiments shown in the FIGS. 1 and 2. The figures each schematically show an exploded view of a film transport device according to the present invention.

DESCRIPTION OF THE PREFERRED EMBODIMENTS

Figure 1:
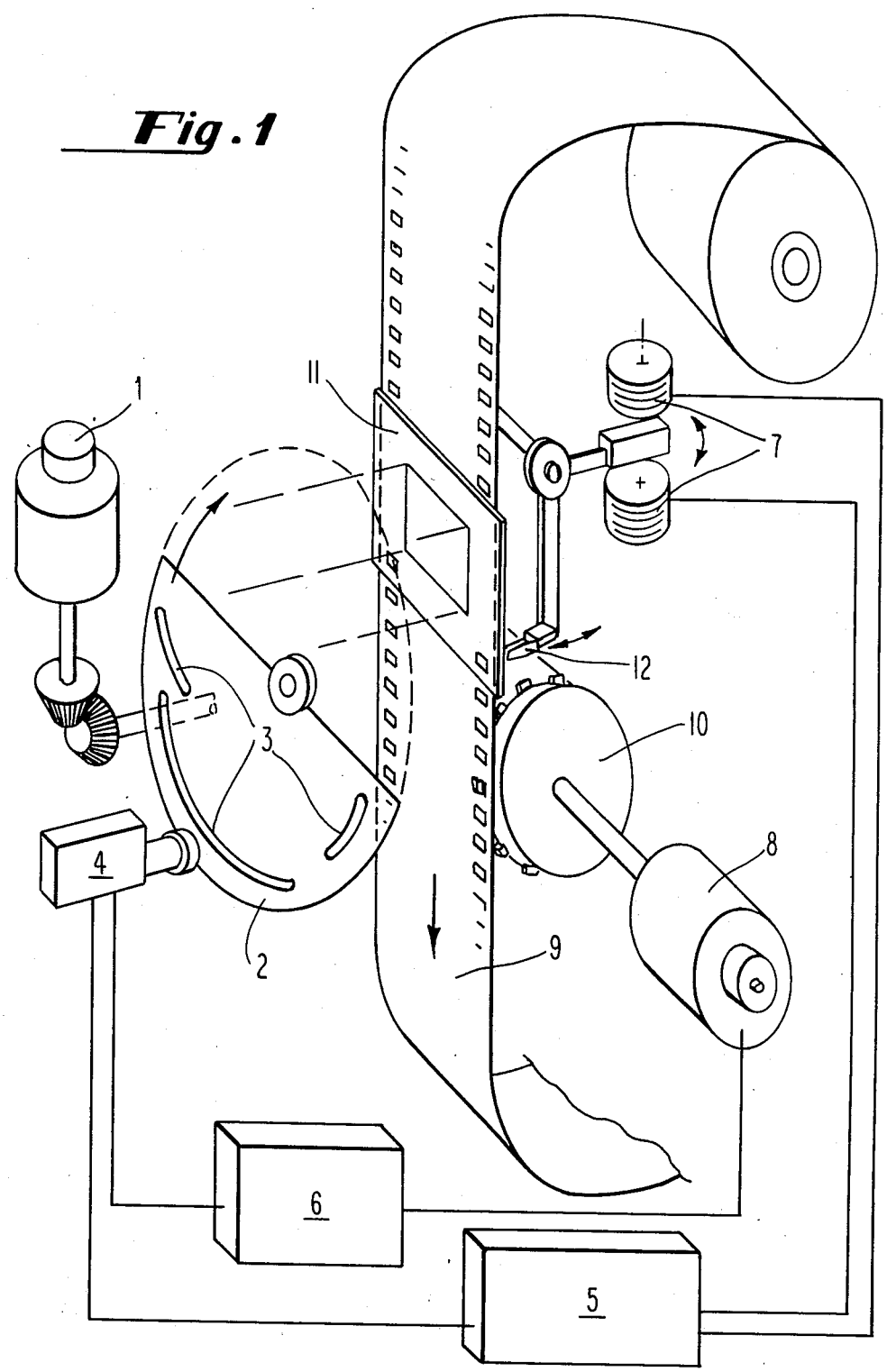

The embodiment of a film transport device and method according to the present invention as illustrated in FIG. 1 has a motor 1 for driving the continuously rotating, single-blade or multi-blade rotary shutter 2. Markings 3, which are scanned by the scanning and control device 4, are provided on the rotary shutter 2. Device 4 comprises a convention sensor or sensor array, and operates in a known fashion. An output of the control unit 4 is connected to the input of the driving unit 5, which in turn drives electromagnetic device 7 which adjusts pin 12. The adjusting pin 12 periodically engages in a perforation of the film 9 which is moving step by step through the film canal 11 containing the picture window. A second adjusting pin (not shown) engages in a perforation of the second perforation row of the film 9 moves parallel with pin 12, and is necessary for the each positioning of the film. Alternately, a guide bar may rephase the said second pin, for laterally pressing the film 9 against a feed edge of the film canal 11. The second output of the control unit 4 is connected to the input of the drive unit 6 for the stepping motor 8, which, in turn, drives the toothed drum 10 engaging in the perforations of the film 9. Even though only one such drum is shown in the drawing, the toothed drum 10 is preferably provided in pairs for film formats with two perforation rows, or it consists of a broad drum with two toothed rims which engage in the two perforation rows of the film 9.

The film transport device shown according to the present invention operates in the following manner: When the exposure of one phase picture has terminated and the rotary shutter 2 has fully closed the picture window in the film canal 11, one of the correspondingly arranged markings 3 on the rotary shutter 2 brings about a pole change of the magnetic field in the drive 7 of the adjusting device. The pole change is caused by an output from scanning and control device 4 and the drive unit 5, and causes the adjusting pin 12 to swing back and release the film 9. At the same time or shortly thereafter the stepping motor control 6 is also activated by one of the markings 3 via the scanning and control device 4; the motor 8 and thus the toothed drum 10 start running; and the film 9 is fed by one frame. Before the rotating rotary shutter 2 clears the picture window again for the exposure of the next phase picture, the magnetic field in the drive 7 of the adjusting device is changed again by the control device 4; the adjusting pin 7 swings forward again through a perforation in the film, and positions the film during the exposure of the next phase picture. The entire process is repeated periodically according to the frame frequency.

Figure 2:
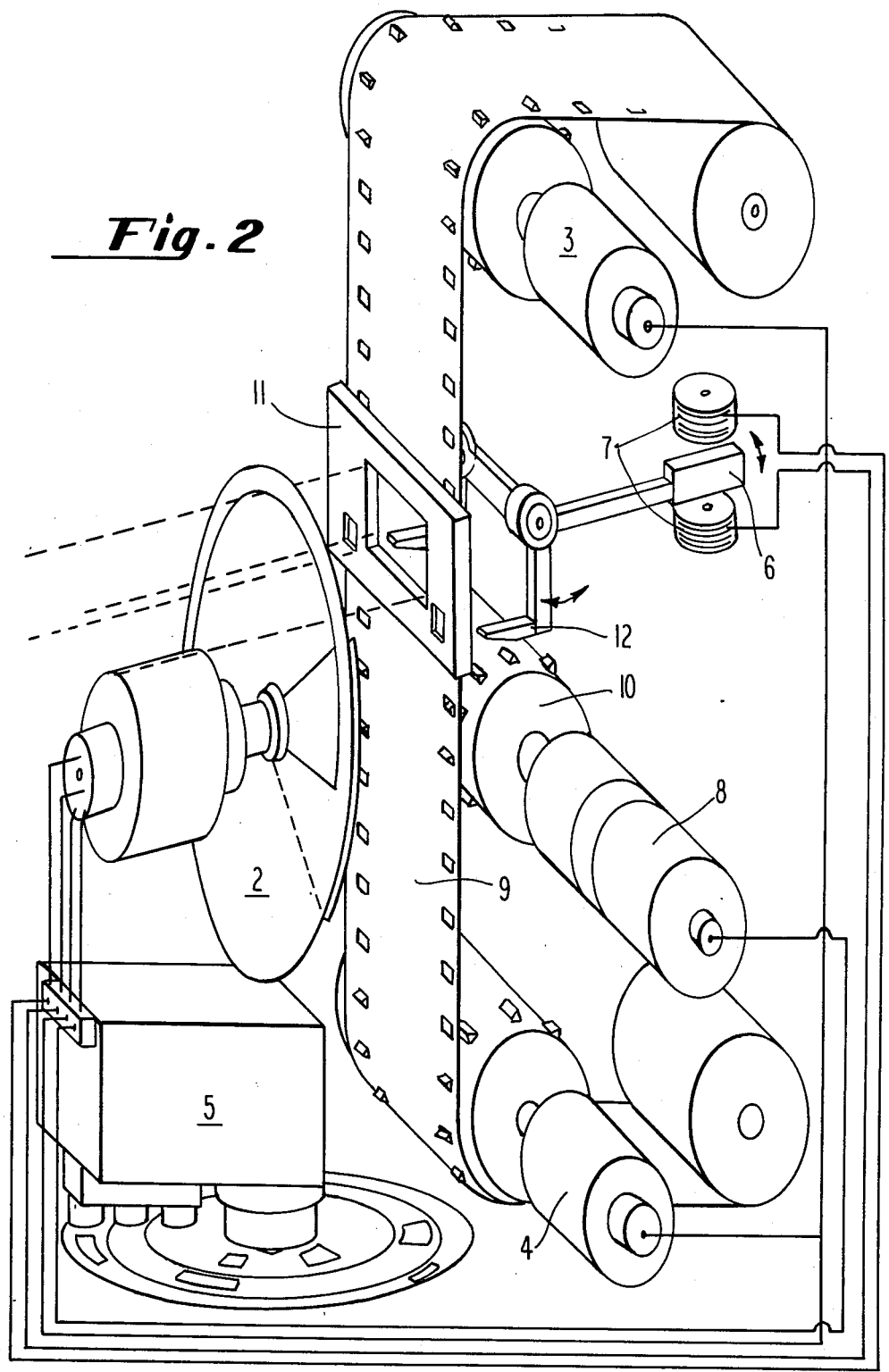

An additional embodiment of a film transport device of the present invention is shown in FIG. 2. In this embodiment, a motor 1 drives a rotary shutter 2 which has a variable partial segment, controlled by shutter-adjusting means incorporated within motor 1, permitting a shutter aperture of about 90° up to greater than 180°. The motor drive is preferably capable of controlling the rate of rotation of the shutter, and with the shutter-adjusting means by which the segment size of the aperture is controlled, is thereby capable of controlling the effective shutter speed. Central control means 5 are provided which includes a multiple pulse disk and a conventional sensor or sensor array. Outputs from the motor drive 1 of rotary shutter 2 are connected to control means 5, which in turn rotates the multiple pulse disk at a rate corresponding to the rate at which the shutter rotates and to the degree of opening of the shutter aperture. The pulse disk contains a plurality of markings which are scanned by the sensor or sensor array of control means 5. The control means operates in known fashion to provide synchronous control of the rotary shutter and other elements of the film transport device.

Two outputs of control means 5 are electrically (and not mechanically) connected to two magnetic poles 7, providing electrical power to each of the poles alternately to attract pendulum armature 6 alternately to one or the other pole, thus driving adjusting pins 12. The pins 12 periodically engage corresponding perforations in film 9, according to the frequency of alternation of pendulum armature 6 between magnetic poles 7, as film 9 moves through film canal 11. Canal 11 contains an aperture of size and position adapted to correspond to each set of perforations in film 9 and to simultaneously receive adjusting pins 12 as those pins engage the perforations of film 9. The adjusting pins are preferably camber shaped and tapered toward their forward (or engaging) ends. As shown in FIG. 2, the camber surface of the pin is preferably its lower surface, which surface is adapted to engage the leading (lower) edge of the perforation. The pins are adapted in positioning and contour to engage the perforations of the film in such a manner that the perforation is completely or substantially completely filled by the pin.

A third output of control means 5 is connected to stepping motor 8 which in turn drives toothed drum 10, containing two sets of teeth which engage the perforations of film 9. A fourth output of control means 5 is connected to stepping motors 3 and 4 which drive a feed toothed drum and take-up toothed drum respectively. Each of these toothed drums contain two sets of teeth adapted to engage the perforations of film 9.

It is to be understood that although the presence of a feed drum and take-up drum is preferred, these can be omitted and the film properly advanced by means only of stepping motor 8 driving toothed drum 10. The transport device of FIG. 2 is designed to accommodate double-perforated film such as film 9 shown here. It is to be further understood, however, that the device is equally applicable to single-perforated film, in which case only one adjusting pin and one set of teeth for each toothed drum need be present.

The film transport device of FIG. 2 operates as follows: When the exposure of one frame of film 9 has terminated and rotary shutter 2 has fully closed the picture window in film canal 11, one of the corresponding arranged markings on the multiple pulse disk produces a pole change between magnetic poles 7. The pole change is brought about as control means 5, through its scanning sensors, detects the passage of the coated markings of the pulse disk, causing control means 4 to change the power output from one pole 7 to the other, which in turn causes adjusting pins 12 to swing back to release film 9. In correspondence with this release, stepping motor 8 and motors 3 and 4 are likewise directed by control means 5 to rotate their corresponding toothed drums to advance the film by one frame. Before the rotary shutter 2 clears the picture window of film canal 11 again for the exposure of the next frame in the film, the power output to magnetic poles 7 is again changed by control means 5, causing adjusting pins 12 to swing forward to engage perforations in the film to position the film properly in film canal 11, and thereby to position the film properly with respect to the shutter, during the exposure of that frame. This cycle is repeated according to the desired rate of frame advancement.

The film transport device of the present invention, as illustrated in FIGS. 1 and 2, has several advantages over those of the prior art. The mechanical separation of the element which drives the film-feed from that which adjusts the film improves the reliability of the film-feeding drive device and reduces the noise which would attend mechanical coupling of these two functions. Noise is especially lowered with the magnetically powered pendulum operation of the adjusting pins in FIG. 2. This is particularly important in high-speed projection in which up to 30 frames per second can be projected. Also, the contour of the adjusting pin and the fact that the pin substantially completely fills the engaged perforation in the film in the preferred embodiment eliminates the need for the film-feed drive, such as the stepping motor, to operate with complex precision; exact positioning of the film is nevertheless provided.

What is claimed is:

1. A film transport device for cinematographic cameras and projectors using perforated film of the kind having a rotary shutter, a shutter drive to rotate the shutter, and film-feeding means comprising engaging means for engaging perforations in the film and a stepping motor for driving said engaging means to advance the film, characterized in that the device comprises (1) film-adjusting means comprising (i) at least one adjusting pin, said pin having a camber surface and being adapted to engage and substantially completely fill the film perforation and position the film with respect to the shutter, and (ii) an electrical or electromagnetic adjusting drive, separate from any other driving mechanism of the transport device, to cause the adjusting pin to alternatively engage and release the film, and (2) central control means for controlling said film-feeding means and said film-adjusting means synchronously with said rotary shutter.

2. A film transport device of claim 1 in which the rotary shutter has a controllably variable aperture size and in which the shutter drive is capable of controlling the shutter aperture size or the rate of rotation of the shutter.

3. A film transport device of claim 1 in which the film-feeding means is at least one toothed drum with a separate stepping motor to drive each toothed drum.

4. A film transport device of claim 2 in which the film-feeding means is at least one toothed drum with a separate stepping motor to drive each toothed drum.

* * * * *